(12) United States Patent
Moriwaki

(10) Patent No.: US 9,575,370 B2
(45) Date of Patent: Feb. 21, 2017

(54) LIQUID CRYSTAL DISPLAY DEVICE

(71) Applicant: Sharp Kabushiki Kaisha, Osaka-shi, Osaka (JP)

(72) Inventor: Hiroyuki Moriwaki, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/423,219

(22) PCT Filed: Aug. 28, 2013

(86) PCT No.: PCT/JP2013/005086
§ 371 (c)(1),
(2) Date: Feb. 23, 2015

(87) PCT Pub. No.: WO2014/038159
PCT Pub. Date: Mar. 13, 2014

(65) Prior Publication Data
US 2015/0301370 A1    Oct. 22, 2015

(30) Foreign Application Priority Data

Sep. 4, 2012   (JP) ................................ 2012-194370

(51) Int. Cl.
| | | |
|---|---|---|
| *G02F 1/1339* | (2006.01) | |
| *G02F 1/1345* | (2006.01) | |
| *G02F 1/1337* | (2006.01) | |
| *G02F 1/1368* | (2006.01) | |
| *G02F 1/1333* | (2006.01) | |

(52) U.S. Cl.
CPC .......... *G02F 1/1339* (2013.01); *G02F 1/1337* (2013.01); *G02F 1/1345* (2013.01); *G02F 1/1368* (2013.01); *G02F 1/133345* (2013.01)

(58) Field of Classification Search
CPC   G02F 1/1339; G02F 1/1345; G02F 1/133345; G02F 1/1337; G02F 1/1368
See application file for complete search history.

(56) References Cited

U.S. PATENT DOCUMENTS

| | | | |
|---|---|---|---|
| 6,525,799 B1* | 2/2003 | Fukuda ................. | G02F 1/1339 349/153 |
| 2005/0122446 A1* | 6/2005 | Jeon .................. | G02F 1/133512 349/110 |
| 2005/0285522 A1* | 12/2005 | Han ....................... | H05B 33/04 313/512 |
| 2006/0139556 A1* | 6/2006 | Ahn ..................... | G02F 1/13394 349/153 |
| 2007/0153167 A1* | 7/2007 | Jang .................. | G02F 1/133512 349/110 |
| 2007/0279565 A1 | 12/2007 | Iwato et al. | |

(Continued)

FOREIGN PATENT DOCUMENTS

| | | |
|---|---|---|
| JP | 2007-322627 A | 12/2007 |
| WO | 2011/129065 A1 | 10/2011 |

*Primary Examiner* — Charles Chang
(74) *Attorney, Agent, or Firm* — Keating & Bennett, LLP

(57) ABSTRACT

An array substrate (20) is formed with a plurality of first grooves (28a), in a sealant region (SL), being apart from each other in the width direction of the sealant region (SL) and extending along a sealant (40) and a plurality of second grooves (28b), in the region where a common transition electrode (26c) is formed, being apart from each other in the length direction of the sealant region (SL) and extending along the width direction of the sealant region (SL).

6 Claims, 12 Drawing Sheets

(56) References Cited

U.S. PATENT DOCUMENTS

2008/0129946 A1* 6/2008 Chan ................... G02F 1/1339
   349/153
2011/0134352 A1* 6/2011 Nakagawa ........... G02F 1/1339
   349/43
2011/0199738 A1* 8/2011 Moriwaki ............ G02F 1/1345
   361/748
2013/0027648 A1   1/2013 Moriwaki

* cited by examiner

LIQUID CRYSTAL DISPLAY DEVICE

TECHNICAL FIELD

The present invention relates to a liquid crystal display device, and particularly relates to the structure of controlling an alignment film formation region in a non-display region of a display panel.

BACKGROUND ART

The thickness of liquid crystal display devices can be reduced, and power consumption of the liquid crystal display devices is low. Thus, the liquid crystal display devices have been broadly used as displays for OA equipment such as television sets and personal computers, mobile electronic devices such as mobile phones and smartphones, and cockpits of automobiles and aircrafts.

The liquid crystal display device includes a display panel and a backlight unit attached to a rear side of the display panel. The display panel has such a configuration that an array substrate and a counter substrate disposed so as to face the array substrate are bonded together with a sealant, and a liquid crystal material is sealed in the space between both substrates. A substrate slightly smaller than the array substrate is used as the counter substrate, and a drive circuit is, using a system on film (SOF) or tape automated bonding (TAB), mounted on terminals of the array substrate exposed by the foregoing size difference.

The display panel has a display region where an image is displayed and a non-display region surrounding the display region. In the display region, a plurality of pixels are arranged in a matrix. A switching element such as a thin film transistor and a pixel electrode connected to the switching element are provided corresponding to each pixel on the array substrate. Moreover, a common electrode is provided so as to cover at least the entirety of the display region of the counter substrate. Current flows through each pixel electrode in synchronization with ON/OFF of an associated one of the switching elements. The common electrode is electrically connected to common transition electrodes provided on the array substrate, a common potential is applied from a common transition electrode lead line to the common electrode through each common transition electrode.

An alignment film is, on the surface of the array substrate contacting a liquid crystal layer, formed so as to cover at least the display region. Similarly, an alignment film is, on the surface of the counter substrate contacting the liquid crystal layer, formed so as to cover at least the display region.

The alignment film can be formed in such a manner that a resin film formed using, e.g., flexographic printing or an ink-jet method and made of, e.g., polyimide is subjected to rubbing or photo-alignment. The ink-jet method is preferably used for formation of the resin film such as a polyimide film because of the following excellent characteristics: a solution can be directly applied to the substrate; a low contamination can be achieved because of the ink-jet method being a non-contact process; a solution consumption amount is low; and a process time can be shortened.

In the case of forming the alignment film by the ink-jet method, resin having a lower viscosity than that used in the case of the flexographic printing is used as a raw material of the alignment film, and therefore, it is likely that the raw material of the alignment film leaks out to the region around the region (display region) targeted for printing. Thus, if the non-display region around the display region is small and a large clearance between the display region and the sealant region cannot be ensured, the alignment film spreads out to the sealant region. In this case, the liquid crystal material of the liquid crystal layer cannot be completely sealed due to insufficient adhesion between the sealant and the alignment film, resulting in leakage of the liquid crystal material of the liquid crystal layer.

In order to solve the foregoing problem, Patent Document 1 discloses a liquid crystal display device configured such that grooves extending along the outer periphery of a display region are formed in a substantially-circular region outside the display region and inside the region where a sealant is applied. According to such a configuration, even if a liquid resin material applied using the ink-jet method spreads outward of the display region, the grooves can prevent spreading of the resin material, and spreading-out and leakage of an alignment film on the outside of the display region can be reduced. Patent Document 1 further discloses the configuration in which a conductive film such as an ITO film is formed on the surfaces of the grooves. Since the liquid resin material, i.e., an alignment film material, has a low wettability to the ITO film, the foregoing configuration can prevent spreading-out and leakage of the liquid resin material from the grooves.

CITATION LIST

Patent Document

PATENT DOCUMENT 1: Japanese Unexamined Patent Publication No. 2007-322627

SUMMARY OF THE INVENTION

Technical Problem

In recent years, in order to satisfy both of the demand of reducing the size of the entirety of a display device and the demand of expanding a display region, the decrease in width of a non-display region at the periphery of the display region has been required particularly for mobile electronic devices. In order to narrow the frame region, common transition electrodes are provided in the region overlapping with a sealant, and the common transition electrodes and a common electrode are electrically connected together through a transfer material, such as conductive beads, contained in the sealant.

However, if an alignment film spreads to the sealant region due to a short distance between the sealant and the display region and covers the common transition electrodes, there is a possibility that sufficient conduction between each common transition electrode and the common electrode cannot be ensured.

The present invention is intended to provide a liquid crystal display device including a narrow frame region and being capable of ensuring sufficient conduction between each common transition electrode and a common electrode.

Solution to the Problem

A liquid crystal display device of the present invention achieving the foregoing objective includes an array substrate having a display region and a non-display region surrounding the display region; a counter substrate disposed so as to face the array substrate and formed with a common electrode; a sealant applied to the non-display region so as to surround the display region and bonding the array substrate and the counter substrate together; a liquid crystal layer formed between the array substrate and the counter substrate in the region surrounded by the sealant; a common transition electrode provided in a sealant region of the array substrate where the sealant is applied; a transfer material contained in the sealant and contacting the common electrode and the common transition electrode to electrically connect the common electrode and the common transition electrode together; and alignment films formed so as to extend across the display region and part of the non-display region, one of the alignment film being formed between the array substrate and the liquid crystal layer and the other alignment film being formed between the counter substrate and the liquid crystal layer. At least one of the array substrate or the counter substrate is formed with a plurality of first grooves, in the sealant region, being apart from each other in the width direction of the sealant region and extending along the length direction of the sealant region, and a plurality of second grooves, in the region corresponding to the region where the common transition electrode is formed, being apart from each other in the length direction of the sealant region and extending along the width direction of the sealant region.

The liquid crystal display device of the present invention is suitable for the case where the sealant region includes a region where the sealant contacts part of the alignment film covering at least surfaces of some of the first grooves.

In the liquid crystal display device of the present invention, the first and second grooves are preferably formed at both of the array substrate and the counter substrate.

In the liquid crystal display device of the present invention, at the array substrate, an insulating film formed below the common transition electrode is preferably formed of a single-layer film of an organic insulating film or a multilayer film of an inorganic insulating film and an organic insulating film formed on the inorganic insulating film, and each first groove is preferably formed at the position where at least the organic insulating film is partially removed.

In the liquid crystal display device of the present invention, the organic insulating film is made of, e.g., acrylic resin.

The transfer material of the present invention is preferably formed of spherical conductive beads, and the width of each first groove and the width of each second groove are preferably less than the diameter of the transfer material.

Advantages of the Invention

According to the present invention, even in the case where the common transition electrode is, in order to narrow a frame region of the display device, formed so as to overlap with the sealant region, the liquid crystal display device capable of ensuring sufficient conduction between the common transition electrode and the common electrode can be provided. In particular, even in the case where the sealant region includes, in order to narrow the frame region, the region where the sealant contacts part of the alignment film covering at least the surfaces of some of the first grooves, the second grooves prevent the alignment film from flowing into the region of the common transition electrode, and therefore, sufficient conduction between the common transition electrode and the common electrode can be ensured.

DESCRIPTION OF EMBODIMENTS

An embodiment of the present invention will be described below in detail.

(Liquid Crystal Display Device)

Figure 1:
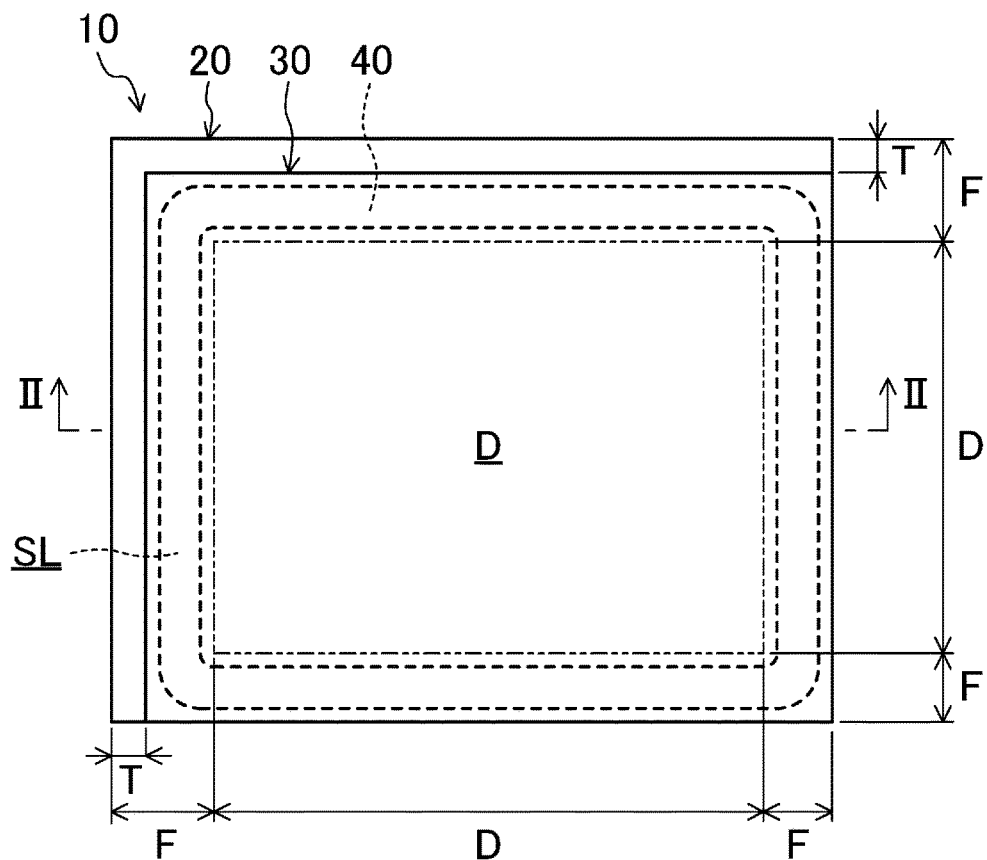
FIG. 1 is a plan view of a liquid crystal display device of an embodiment.
Figure 2:
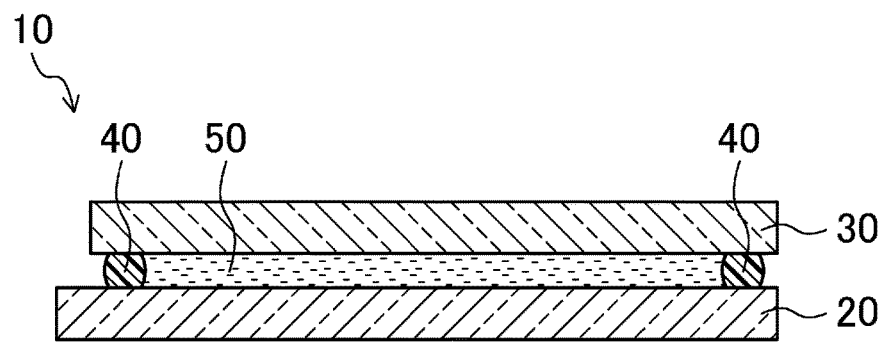
FIG. 2 is a cross-sectional view along an II-II line of FIG. 1.
Figure 3:
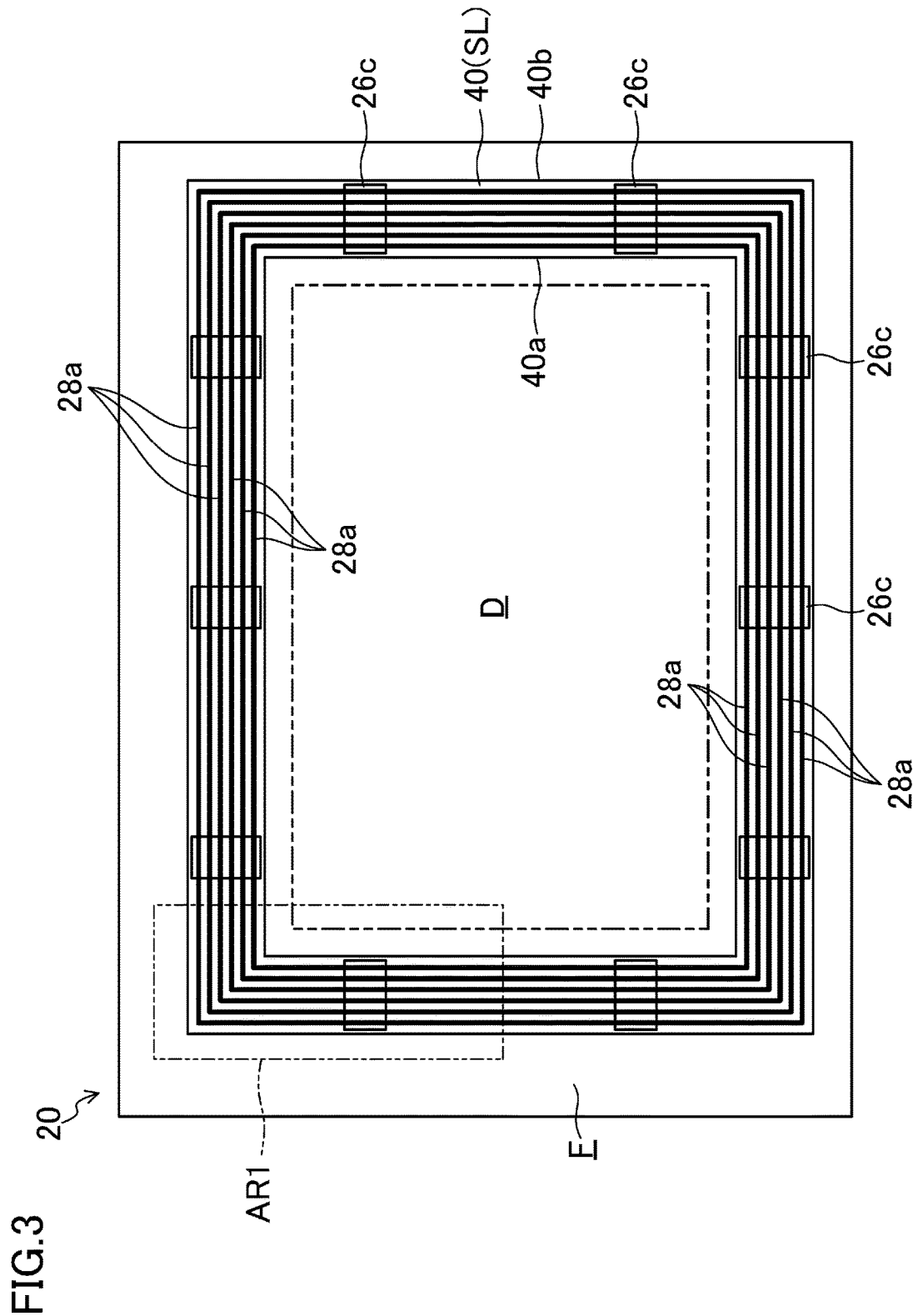
FIG. 3 is a schematic plan view of an array substrate of the embodiment.
Figure 4:
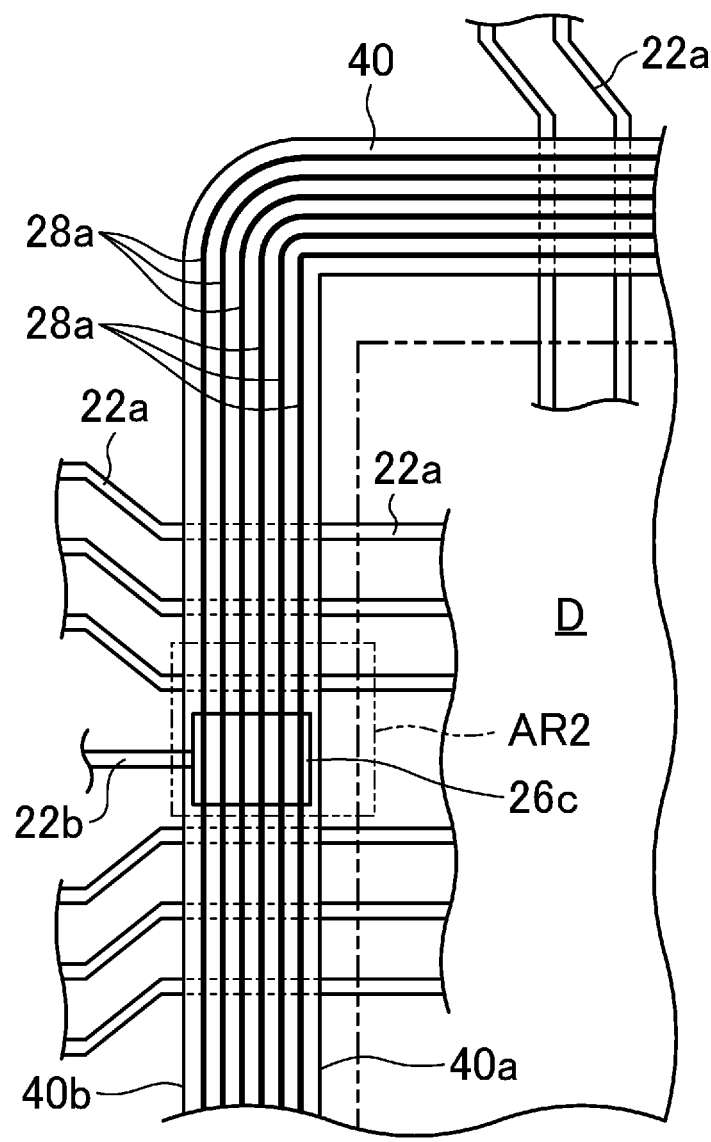
FIG. 4 is an enlarged plan view in a region AR1 of FIG. 3.
Figure 5:
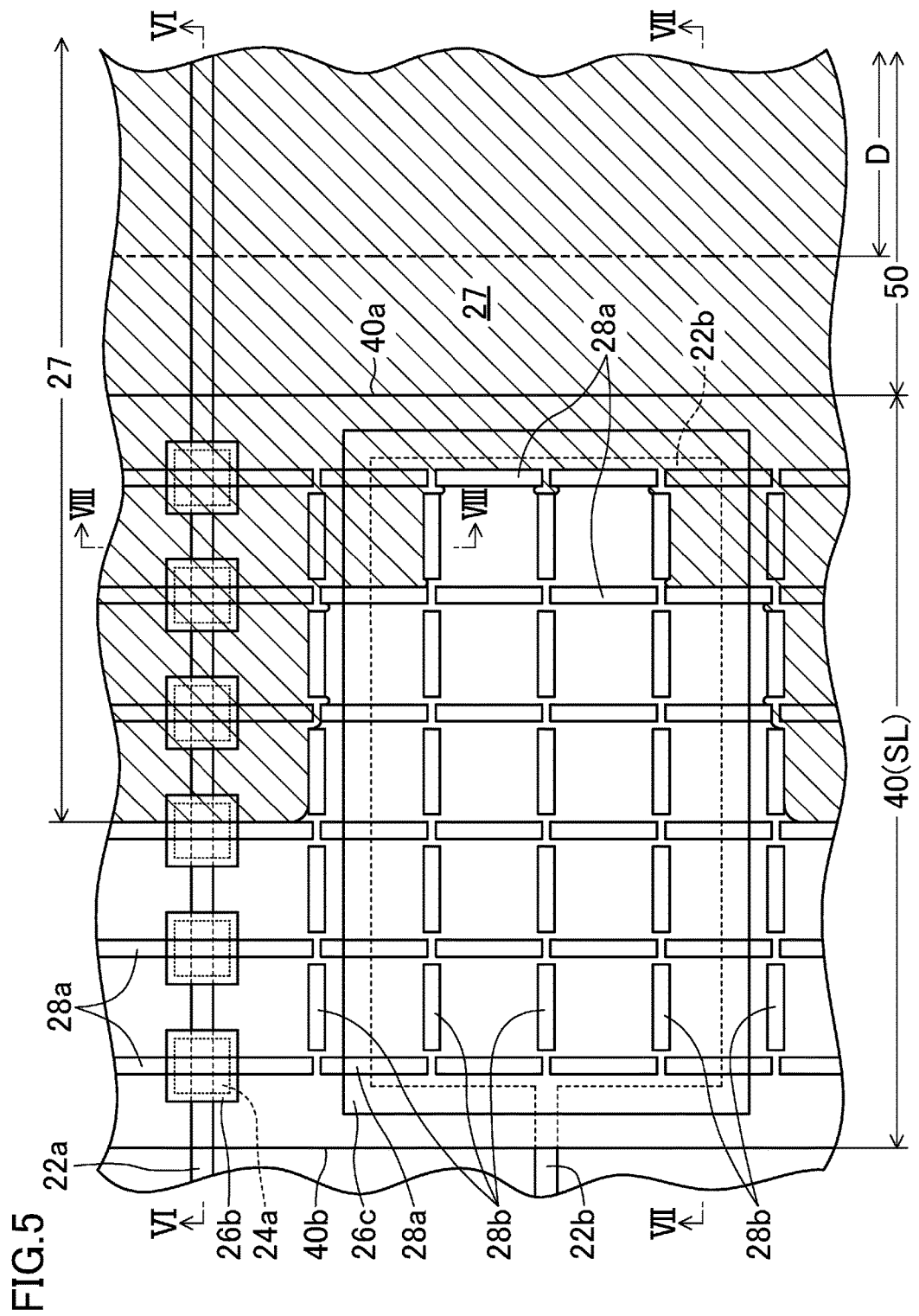
FIG. 5 is an enlarged plan view in a region AR2 of FIG. 4.
Figure 7:
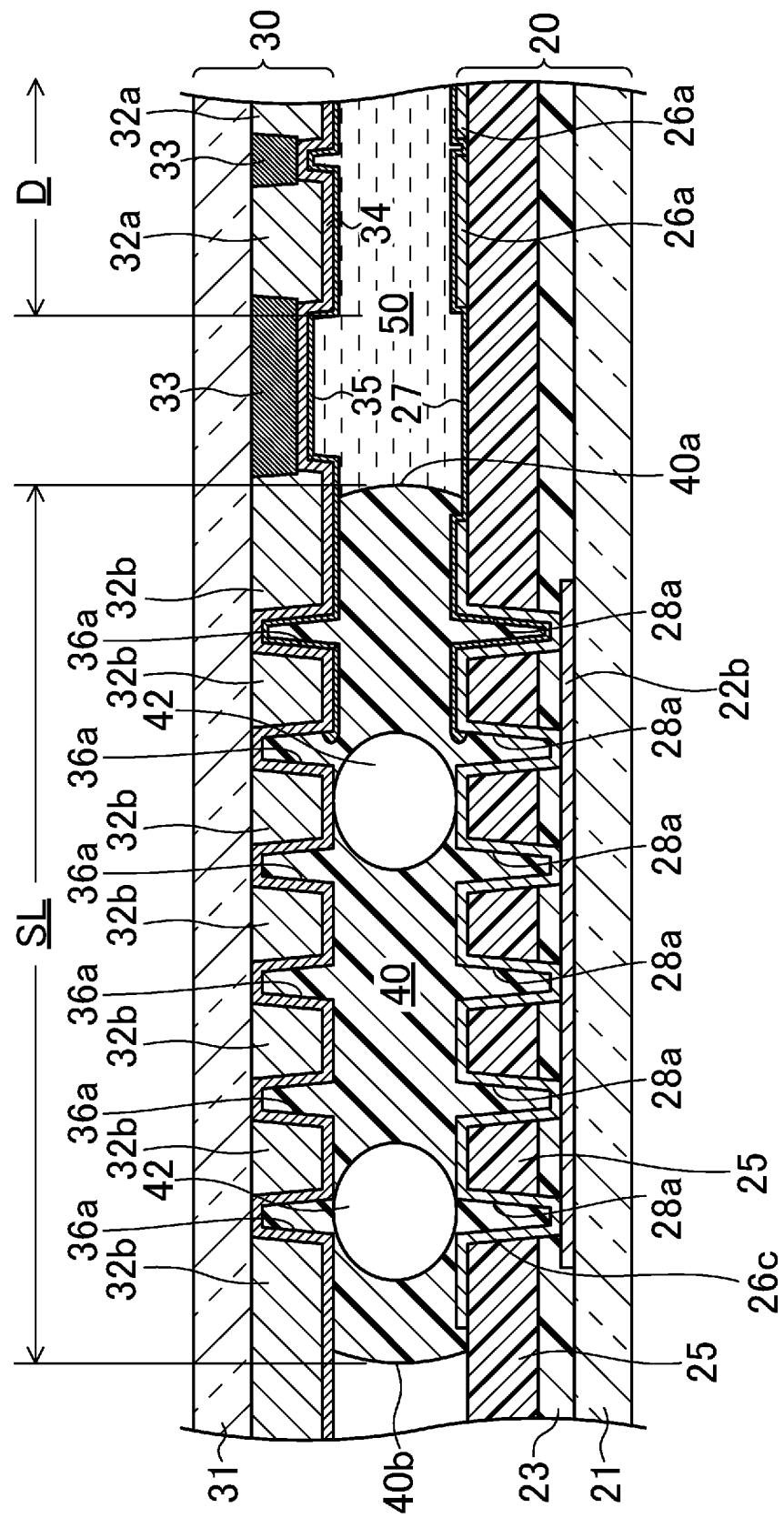
FIG. 7 is a cross-sectional view along a VII-VII line of FIG. 5.
Figure 8:
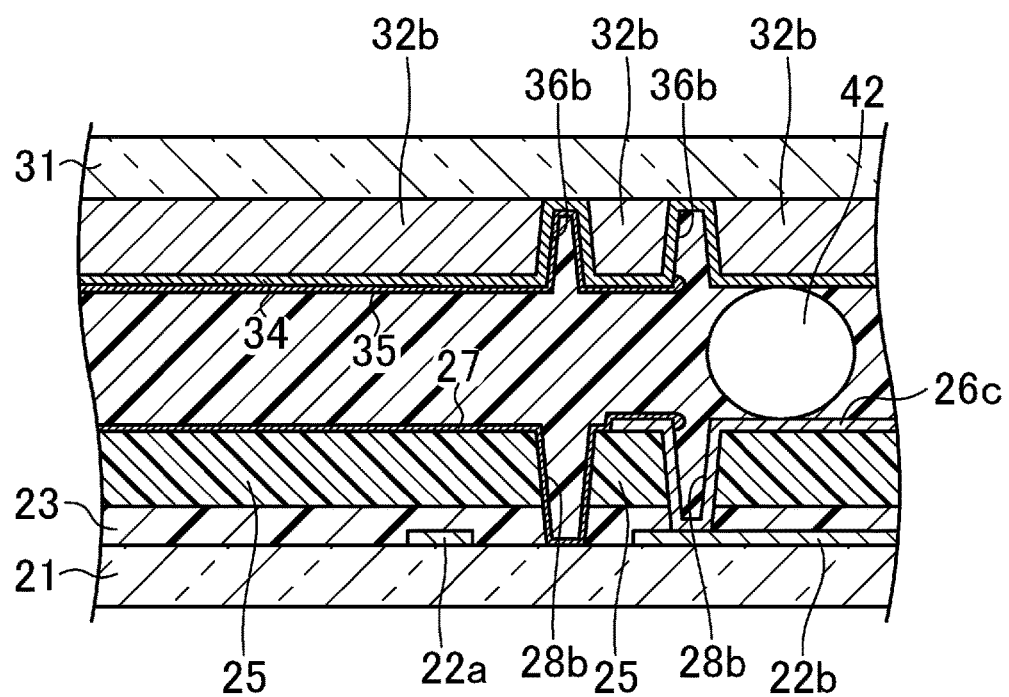
FIG. 8 is a cross-sectional view along a VIII-VIII line of FIG. 5.

FIGS. 1 and 2 illustrate a schematic view of the entirety of a liquid crystal display device 10 of the present embodiment. FIG. 3 is a schematic plan view of an array substrate 20, FIG. 4 is an enlarged view of a region AR1 of FIG. 3, and FIG. 5 is an enlarged view of a region AR2 of FIG. 4. In addition, FIG. 6 is a cross-sectional view of the liquid crystal display device 10 illustrating the cross section along a VI-VI line of FIG. 5, FIG. 7 is a cross-sectional view of the liquid crystal display device 10 illustrating the cross section along a VII-VII line of FIG. 5, and FIG. 8 is a cross-sectional view of the liquid crystal display device 10 illustrating the cross section along a VIII-VIII line of FIG. 5.

Referring to FIGS. 1 and 2, the liquid crystal display device 10 is configured such that a frame-shaped non-display region F is defined at a substrate circumferential edge part and that the region surrounded by the non-display region F is a display region D. The liquid crystal display device 10 includes the array substrate 20 and a counter substrate 30 arranged so as to face each other. The array substrate 20 and the counter substrate 30 are, at outer circumferential edge parts thereof, bonded together with a circular sealant 40 forming a sealant region SL and applied in a frame shape. Note that the sealant 40 may be, other than application of the sealant 40 in a circular shape, applied such that part of the sealant 40 opens as a liquid crystal injection port. In this case, a liquid crystal material is injected by vacuum dipping, and then, the liquid crystal injection port is sealed with a sealing material. A liquid crystal layer 50 is formed in the space surrounded by the substrates 20, 30 and the sealant 40, and forms the display region D. In the display region D, a plurality of pixels are arranged in a matrix. Part of the array substrate 20 corresponding to the non-display region F around the display region D protrudes from the counter substrate 30, and forms a terminal region T to which external connection terminals such as components to be mounted are attached.

(Array Substrate)

Figure 6:
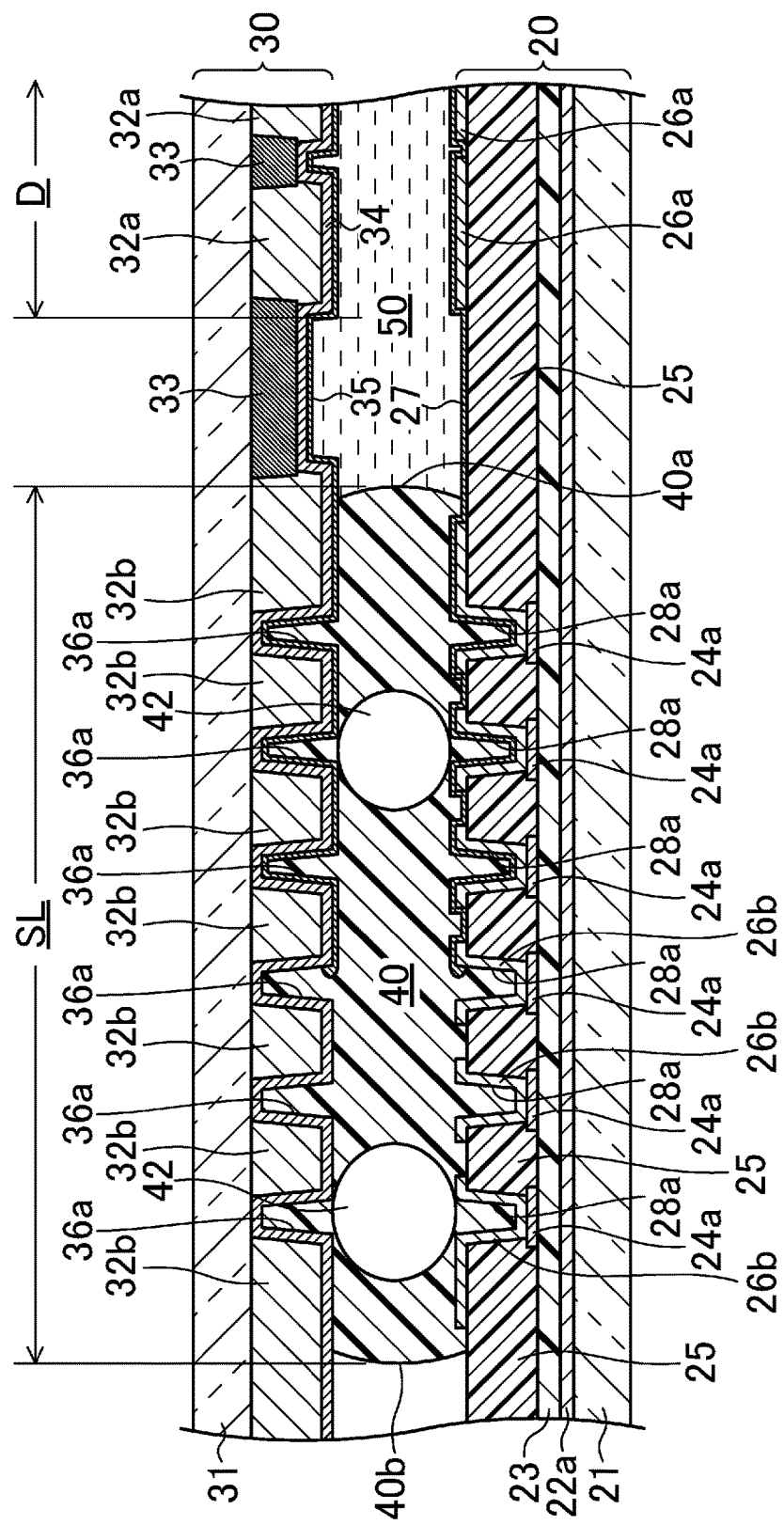
FIG. 6 is a cross-sectional view along a VI-VI line of FIG. 5.

In the case where the array substrate 20 includes bottom gate thin film transistors, a first conductive film (first interconnect) including gate signal lines (not shown), a gate insulating film (first insulating film) 23, a silicon film (not shown), a second conductive film (second interconnect) including source signal lines (not shown), an interlayer insulating film (second insulating film) 25, and a third conductive film including pixel electrodes 26a are formed and stacked on a substrate body 21 (see FIG. 6). The first and second conductive films are formed of, e.g., a multilayer of a titanium (Ti) film and a cupper (Cu) film formed thereon. The gate insulating film (first insulating film) 23 is formed of, e.g., a silicon nitride (SiNx) film. The interlayer insulating film (second insulating film) 25 is formed of, e.g., a multilayer of an inorganic insulating film (e.g., a silicon nitride (SiNx) film) formed as a passivation film and an organic insulating film (e.g., an acrylic resin film) formed thereon. In the case of top gate thin film transistors, an underlying inorganic film is formed on a substrate, and then, a silicon film is formed. Subsequently, a gate insulating film 23 is formed before formation of a first conductive film, and an insulating film covering the first conductive film is formed as a first insulating film.

Specifically, in the display region D of the array substrate 20, the gate signal lines and the source signal lines are arranged such that the gate signal lines are parallel to each other, that the source signal lines are parallel to each other, and that the gate signal lines and the source signal lines intersect with each other. Each of the regions divided by the gate signal lines and the source signal lines forms a single pixel, and each thin film transistor is provided for an associated one of the pixels. Each pixel electrode 26a is arranged corresponding to an associated one of the thin film transistors. The interlayer insulating film 25 is formed so as to cover the entirety of the substrate including the non-display region F. In the non-display region F of the array substrate 20, the source and gate signal lines extend, using lead lines (e.g., interconnects 22a in FIGS. 6 and 7), to the terminal region T, and are each connected to an associated one of gate drivers (not shown) and source drivers (not shown). Referring to FIG. 3, in the sealant region SL of the array substrate 20, common transition electrodes 26c for applying a common potential to a later-described common electrode 34 are provided. Referring to FIG. 4, each common transition electrode 26c is, through an associated one of lead lines 22b, connected to a COM circuit (not shown) provided in the terminal region T and generating a common signal.

An alignment film 27 is formed on the surface of the array substrate 20 close to the liquid crystal layer 50 (i.e., the surface between the array substrate 20 and the liquid crystal layer 50) so as to cover the entirety of the display region D and part of the non-display region F. Referring to FIG. 5, the alignment film 27 is formed so as to extend outward of the display region D to the region overlapping with the sealant region SL. Although described later, the alignment film 27 extends to the region overlapping with the sealant region SL, but does not cover the entirety of the sealant region SL (i.e., formed so as not to reach the outer circumferential side 40b of the sealant 40). The alignment film 27 is made of, e.g., polyimide.

(Counter Substrate)

The counter substrate 30 is configured such that color filter layers 32a, a black matrix 33, and a common electrode 34 are formed and stacked on a substrate body 31. In the non-display region F at the outer circumferential edge part of the counter substrate 30, the black matrix 33 forms a light shielding region (not shown) as necessary. Specifically, in the display region D of the counter substrate 30, each color filter layer 32a is formed corresponding to an associated one of the pixels, and is colored red, green, or blue depending on the color of light to be emitted. Moreover, the black matrix 33 is provided in the light shielding region dividing the color filter layers 32a. The common electrode 34 is provided so as to cover the entirety of the counter substrate 30 including the non-display region F, and is held at the common potential applied from the common transition electrodes 26c provided in the non-display region F of the array substrate 20. Note that the common electrode 34 may be patterned as necessary, other than formation of the common electrode 34 across the entirety of the counter substrate 30. In the non-display region F of the counter substrate 30, color filter layers 32b are formed using the same resin as the material forming the color filter layers 32a. The color filter layers 32b are formed corresponding to at least the sealant region SL of the non-display region F.

An alignment film 35 is formed on the surface of the counter substrate 30 close to the liquid crystal layer 50 (i.e., the surface between the counter substrate 30 and the liquid crystal layer 50) so as to cover the entirety of the display region D and part of the non-display region F. The alignment film 35 is formed so as to extend outward of the display region D to the region overlapping with the sealant region SL. Although described later, the alignment film 35 extends to the region overlapping with the sealant region SL, but does not cover the entirety of the sealant region SL (i.e., formed so as not to reach the outer circumferential side 40b of the sealant 40). The alignment film 35 is made of, e.g., polyimide.

(Sealant)

The sealant 40 is made of, e.g., thermosetting resin or ultraviolet curable resin. The sealant region SL is formed in, e.g., a frame shape having a width of 0.3 to 1.2 mm.

The sealant 40 contains crushed glass fibers (not shown) as a spacer for maintaining a constant distance between the array substrate 20 and the counter substrate 30. Moreover, the sealant 40 contains a transfer material 42 in order to electrically connect the common electrode 34 and the common transition electrodes 26c together and to apply the common potential from the common transition electrodes 26c to the common electrode 34.

The crushed glass fibers have, e.g., a diameter of about 4 to 8 μm and a length of about 10 to 100 μm. In order to prevent the crushed glass fibers from entering first grooves 28a and first grooves 36a, crushed glass fibers having greater diameter and length than the width of the first groove 28a and the first groove 36a are used. The crushed glass fibers are sandwiched between a surface of the interlayer insulating film 25 and a surface of each color filter layer 32b to maintain a constant distance between the array substrate 20 and the counter substrate 30.

The transfer material 42 is formed of, e.g., conductive beads formed in such a manner that gold is vapor-deposited on outer surfaces of polymer beads. The transfer material 42 has an outer diameter of, e.g., about 5 to 60 μm. As described above, the transfer material 42 directly contacts the common transition electrodes 26c of the array substrate 20 and the common electrode 34 of the counter substrate 30 to electrically connect the common transition electrodes 26c and the common electrode 34 together.

(Liquid Crystal Layer)

The liquid crystal layer 50 is made of, e.g., nematic liquid crystal.

(Configuration of Grooves of Array Substrate)

In the sealant region SL of the array substrate 20 described above, the first grooves 28a are, referring to FIGS. 3 and 4, formed in a circular shape so as to surround the display region D. The plural lines of first grooves 28a are formed apart from each other in the width direction of the sealant region SL so as to extend along the sealant 40. Two to twenty lines of first grooves 28a are preferably formed (six lines in FIGS. 3 to 7). Referring to FIGS. 6 and 7, each first groove 28a is formed at part of the array substrate 20 from which the interlayer insulating film 25 is removed. The first groove 28a has a width of 2 to 50 µm, and more preferably 4 to 20 µm. The first grooves 28a are formed at a pitch of, e.g., 4 to 10 µm.

In the region of the array substrate 20 where the common transition electrodes 26c are formed, second grooves 28b intermittently extend along the width direction of the sealant region as illustrated in an enlarged plan view of FIG. 5. The plural lines (five lines in FIG. 5) of second grooves 28b are formed apart from each other in the length direction of the sealant region SL. Referring to FIGS. 6 and 7, the second grooves 28b are formed in such a manner that the interlayer insulating film 25 and the gate insulating film 23 are partially removed. The second groove 28b has a width of 2 to 50 µm, and preferably a width of 4 to 20 µm. The second grooves 28b are formed at a pitch of, e.g., 4 to 100 µm. Note that, referring to FIG. 5, each second groove 28b is discontinuous at the region where the each second groove 28b intersects with an associated one of the first grooves 28a. Such a discontinuous part of the second groove 28b has a length of, e.g., 12 to 160 µm. Moreover, each first groove 28a is also discontinuous at the region where the each first groove 28a intersects with an associated one of the second grooves 28b. Such a discontinuous part of the first groove 28a preferably has a length of, e.g., equal to or greater than 4 µm, considering processing accuracy. In addition, the discontinuous part of the first groove 28a preferably has a length of, e.g., equal to or less than 30 µm, considering the upper limit of the size of the first groove 28a which can block polyimide.

Note that "the region corresponding to the region where the common transition electrodes 26c are formed" is not necessarily the totally same area as the region where the common transition electrodes 26c are formed, and may be the region in the vicinity of the region where the common transition electrodes 26c are formed. Specifically, referring to FIG. 5, the outermost ones of the second grooves 28b may be formed in the region which does not overlap with the common transition electrodes 26c as viewed in the plane.

In the region of the array substrate 20 corresponding to the bottom of each first groove 28a, an island-shaped stopper layer 24a is formed corresponding to the intersection between each interconnect 22a and the each first groove 28a. The stopper layers 24a are formed of the second conductive film, and are formed at the same time as formation of the source signal lines. Since the stopper layers 24a are formed, each interconnect 22a positioned corresponding to the bottom of an associated one of the first grooves 28a is not exposed through the associated one of the first grooves 28a, and leakage between the interconnects 22a which are adjacent to each other through a substance, such as conductive dust, present on the surface of the first groove 28a does not occur. Thus, even if the first grooves 28a are formed so as to cross, e.g., the interconnects 22a formed of the first conductive film, problems such as short circuit between the interconnects 22a are not caused.

Some of the stopper layers 24a may be connected to the common transition electrodes 26c. In this case, the stopper layers 24a may be in conduction with the common electrode 34 through the transfer material 42. However, the stopper layers 24a are merely held at the same common potential as that of the common electrode 34, and problems due to current leakage, such as display defects, are not caused. Ones of the stopper layers 24a which are not connected to the common transition electrodes 26c are in a floating state, but problems due to current leakage, such as display defects, are not caused even if the stopper layers 24a in the floating state are in conduction with the common electrode 34.

At the intersection between the interconnect 22a and the first groove 28a, a transparent conductive film 26b is formed in an island shape so as to cover the surface of the first groove 28a. This prevents the stopper layer 24a formed below the bottom of the first groove 28a from being exposed through the first groove 28a, thereby reducing corrosion and degradation of the stopper layer 24a. The transparent conductive film 26b is formed of the third conductive film, and is formed at the same time as formation of the pixel electrodes 26a. Note that the transparent conductive film 26b is not an essential element.

Referring to FIGS. 7 and 8, in the region of the sealant region SL where the common transition electrodes 26c are formed, the lead lines 22b are formed corresponding respectively to the bottoms of the first and second grooves 28a, 28b. Moreover, in the region of the sealant region SL where the common transition electrodes 26c are formed, the surfaces of the first and second grooves 28a, 28b are, referring to FIGS. 7 and 8, covered by the common transition electrodes 26c. Thus, the lead line 22b and the common transition electrode 26c are electrically connected together through the first or second groove 28a, 28b serving as a contact hole.

Since the first grooves 28a are, at the array substrate 20, formed in a circular shape so as to surround the display region D, flow of the liquid of alignment film material from the display region D toward the non-display region F in forming the alignment film 27 is reduced, and therefore, the area where the alignment film material flows out can be reduced.

As described above, the sealant 40 is formed in a circular shape on the outside of the display region D, and bonds the array substrate 20 and the counter substrate 30 together. Referring to FIG. 6, the surfaces of some (four of six first grooves 28a in FIG. 6) of the first grooves 28a are covered by the alignment film 27. In the region of the sealant region SL including an inner circumferential side 40a of the sealant 40, the first grooves 28a covered by the alignment film 27 are filled with the sealant 40, and therefore, the sealant 40 contacts the alignment film 27. On the other hand, in the region of the sealant region SL including the outer circumferential side 40b of the sealant 40, no alignment film 27 is formed, and therefore, the sealant 40 directly contacts the interlayer insulating film 25 and the transparent conductive film 26b on the side close to the array substrate 20.

In the region where the common transition electrodes 26c are formed, the second grooves 28b restrict the alignment film 27 from flowing out in the direction toward the center of the common transition electrode 26c. Thus, even in the region of the sealant region SL including the inner circumferential side 40a of the sealant 40 and covered by the alignment film 27 at part of the liquid crystal display device 10 where there are no second grooves 28b, the center part of each common transition electrode 26c is not covered by the alignment film 27, and the sealant 40 and the common transition electrodes 26c directly contact each other.

Note that the width of the first groove 28a and the width of the second groove 28b are preferably less than the diameter of the transfer material 42. If the width of the first groove 28a and the width of the second groove 28b are greater than the diameter of the transfer material 42, there is a possibility that the transfer material 42 is caught in the first grooves 28a and the second grooves 28b. If the transfer material 42 is caught in the first grooves 28a and the second grooves 28b, the transfer material 42 may not be able to contact the common electrode 34 of the counter substrate 30, resulting in insufficient conduction between each common transition electrodes 26c and the common electrode 34.

(Configuration of Groove of Counter Substrate)

As in the array substrate 20, first grooves 36a are, in the sealant region SL of the counter substrate 30, formed in a circular shape so as to surround the display region D (see FIGS. 6 and 7). The plural lines of first grooves 36a are formed apart from each other in the width direction of the sealant region SL so as to extend along the sealant 40. Two to twenty lines of first grooves 36a are preferably formed (six lines in FIGS. 6 and 7). Referring to FIGS. 6 and 7, each first groove 36a is formed at part of the counter substrate 30 from which the color filter layer 32b is removed. The first groove 36a has a width of 2 to 50 μm, and more preferably 4 to 20 μm. The first grooves 36a are formed at a pitch of, e.g., 4 to 100 μm.

As in the array substrate 20, in the region of the counter substrate 30 corresponding to the region where the common transition electrodes 26c are formed, second grooves 36b are formed so as to intermittently extend along the width direction of the sealant region SL. The plural lines of second grooves 36b are formed apart from each other in the length direction of the sealant region SL. Referring to FIG. 8, the second grooves 36b are formed in such a manner that the color filter layers 32b are partially removed. The second groove 36b has a width of 2 to 50 μm, and preferably a width of 4 to 20 μm. The second grooves 36b are formed at a pitch of, e.g., 4 to 100 μm. The details of the configuration of the first grooves 36a and the second grooves 36b formed at the counter substrate 30 and the details of the region where the alignment film 35 is present correspond to those of the array substrate 20.

(Operation of Liquid Crystal Display Device)

In the liquid crystal display device 10 having the foregoing configuration, when the TFT is turned ON at each pixel, current flows through the pixel electrode 26a. Then, a potential difference between each pixel electrode 26a and the common electrode 34 held at the common potential is caused, and then, a predetermined voltage is applied to a liquid crystal capacitance formed of the liquid crystal layer 50. Then, the transmittance of light entering from the outside is adjusted using the change in alignment state of liquid crystal molecules depending on the magnitude of the applied voltage, and a desired image is displayed on the liquid crystal display device 10.

(Method for Manufacturing Liquid Crystal Display Device)

Next, the method for manufacturing the liquid crystal display device 10 having the foregoing configuration will be described.

First, a first conductive film including gate signal lines and interconnects 22a, a gate insulating film 23, a silicon film, and a second conductive film including source signal lines and stopper layers 24a are, using a well-known method, stacked in this order on a substrate body 21.

Next, e.g., a silicon nitride (SiNx) film is formed as an inorganic insulating film so as to the entirety of the substrate, and then, an acrylic resin film is formed as an organic insulating film. In this manner, an interlayer insulating film 25 is formed. After exposure of the photosensitive acrylic resin film formed as the organic insulating film, development is performed for the acrylic resin film, thereby removing part of the acrylic resin film corresponding to first grooves 28a. Further, part of the silicon nitride (SiNx) film corresponding to the first grooves 28a is removed in such a manner that the silicon nitride film is dry-etched using the acrylic resin film as a mask. In this manner, the first grooves 28a are formed. Alternatively, in the case of forming a non-photosensitive acrylic resin film as the organic insulating film, development is performed separately or simultaneously for two layers after application of a resist agent, and then, part of the interlayer insulating film 25 is removed by etching. In this manner, the first grooves 28a and second grooves 28b are formed. At this point, a stopper layer 24a, a common transition electrode 26c, or the substrate body 21 are exposed through the first or second groove 28a, 28b formed by removal of the interlayer insulating film 25.

Next, a third conductive film including pixel electrodes 26a and a transparent conductive film 26b is formed using a transparent conductive material such as ITO or IZO.

Then, an alignment film 27 is formed by an ink-jet method so as to cover a display region D. At this point, the liquid of polyimide which is an alignment film material flows and spreads to a non-display region F. However, since the first grooves 28a restrict the polyimide from flowing out, no polyimide film is formed on some of the first grooves 28a positioned on the outer circumferential side relative to the middle one of the first grooves 28a. Moreover, since the second grooves 28b restrict the polyimide from flowing out to the region where the common transition electrodes 26c are formed, the region of the common transition electrodes 26c covered by the alignment film 27 can be reduced even on the inner side relative to the middle of a sealant region SL in the width direction thereof (i.e., even in the region of the sealant region SL in which the surface of the array substrate 20 is covered by the polyimide due to incomplete restriction of flowing-out of the polyimide by the first grooves 28a and which includes an inner circumferential side 40a of a sealant 40). That is, the area where the common transition electrodes 26c are exposed can be further increased.

On the other hand, color filter layers 32a, 32b and a black matrix 33 are, using a well-known method, formed on a substrate body 31. Then, after exposure of the color filter layers 32b, development is performed for the color filter layers 32b, thereby removing part of the color filter layers 32b. In this manner, first grooves 36a are formed. In the case of the color filter layers 32b having no photosensitivity, development is performed after application of a resist agent, and then, part of the color filter layers 32b is removed by etching. In this manner, the first grooves 36a are formed. A common electrode 34 is formed so as to cover the first grooves 36a. Then, an alignment film 35 is formed as in the alignment film 27 of the array substrate 20. At this point, the liquid of polyimide which is an alignment film material flows and spreads to the non-display region F. However, since the first grooves 36a restrict the polyimide from flowing out, no polyimide film is formed on some of the first grooves 36a positioned on the outer circumferential side relative to the middle one of the first grooves 36a. Moreover, since second grooves 36b restrict the polyimide from flowing out to the region where the common transition electrodes 26c are formed, the region of the common transition electrodes 26c covered by the alignment film 35 can be reduced even on the inner side relative to the middle of a sealant region SL in the width direction thereof (i.e., even in the region of the sealant region SL in which the surface of the counter substrate 30 is covered by the polyimide due to incomplete restriction of flowing-out of the polyimide by the first grooves 36a and which includes the inner circumferential side 40a of the sealant 40). That is, the area where the common transition electrodes 26c are exposed can be further increased.

Subsequently, the sealant 40 is applied to the surface of either one of the array substrate 20 or the counter substrate 30 formed as described above, and a liquid crystal material is dropped onto the region surrounded by the sealant 40. Then, the sealant 40 is cured with the substrates 20, 30 being stacked on each other, thereby bonding the substrates 20, 30 together. In this manner, a display panel is formed.

Note that, as another method other than the foregoing, the liquid crystal material may be introduced between the substrates 20, 30 by vacuum injection using capillarity. Specifically in this case, the sealant 40 is applied in a frame shape with an opening serving as a liquid crystal material injection port, and then, the substrates 20, 30 are bonded together. Subsequently, the sealant 40 is cured. Then, after the substrates are cut to a cell size, the liquid crystal material is injected through the opening of the sealant 40 under vacuum atmosphere. Finally, the injection port is sealed with a sealant.

Finally, after the substrates are cut to the cell size, modularization such as bonding of a polarizer to the display panel, mounting of components, and attachment of a backlight is performed. In this manner, a liquid crystal display device 10 is formed.

Advantages of the Present Embodiment

According to the liquid crystal display device 10 having the configuration of the present embodiment, the first grooves 28a are formed in the sealant region SL at the array substrate 20. Thus, the first grooves 28a restrict the alignment film material from flowing outward of the substrate in applying the alignment film material by the ink-jet method, and the alignment film 27 is formed so as to extend to the middle of the sealant region SL in the width direction thereof (see the shaded region illustrated in FIG. 5). Moreover, the second grooves 28b being apart from each other in the length direction of the sealant region SL and extending along the width direction of the sealant region SL are formed in the region where the common transition electrodes 26c are formed, and this restricts the alignment film 27 from flowing out in the direction toward the center of the common transition electrode 26c. Thus, the center part of the common transition electrode 26c is not covered by the alignment film 27 even on the side close to the display region D relative to the middle of the sealant region SL in the width direction thereof (i.e., even in the region of the sealant region SL including the inner circumferential side 40a of the sealant 40), and therefore, is exposed so as to contact the sealant 40.

In addition, according to the liquid crystal display device 10 having the configuration of the present embodiment, the first grooves 36a are formed in the sealant region SL at the counter substrate 30. The first grooves 36a restrict the alignment film material from flowing outward of the substrate in applying the alignment film material by the ink-jet method, and the alignment film 35 is formed so as to extend to the middle of the sealant region SL in the width direction thereof. Moreover, the second grooves 36b being apart from each other in the length direction of the sealant region SL and extending along the width direction of the sealant region SL are formed in the region corresponding to the region where the common transition electrodes 26c are formed, and this restricts the alignment film 35 from flowing out in the direction toward the center of the common transition electrode 26c. Thus, the common electrode 34 is not covered by the alignment film 35 in the region corresponding to the center part of the common transition electrode 26c even on the side close to the display region D relative to the middle of the sealant region SL in the width direction thereof (i.e., even in the region of the sealant region SL including the inner circumferential side 40a of the sealant 40), and therefore, is exposed so as to contact the sealant 40.

In the region where the common transition electrodes 26c are formed at the array substrate 20, the common transition electrodes 26c are uncovered by the alignment film 27 to contact the sealant 40 at the array substrate 20, whereas the common electrode 34 is uncovered by the alignment film 35 to contact the sealant 40. Thus, the common transition electrodes 26c and the common electrode 34 are electrically connected together through the transfer material 42 contained in the sealant 40. As a result, even in the case where the alignment film 27 is formed so as to extend to the sealant region SL, there is no possibility that conduction between each common transition electrode 26c and the transfer material 42 becomes insufficient. Moreover, even in the case where the alignment film 35 is formed so as to extend to the sealant region SL, there is no possibility that conduction between the common electrode 34 and the transfer material 42 becomes insufficient. As a result, sufficient conduction between each common transition electrode 26c and the common electrode 34 is ensured.

Note that since the first grooves 28a are formed at the array substrate 20, the alignment film 27 does not reach the region of the sealant region SL including the outer circumferential side 40b of the sealant 40.

For more details on the bonding state between the array substrate 20 and the sealant 40 outside the middle of the sealant region SL in the width direction thereof (i.e., in the region of the sealant region SL including the outer circumferential side 40b of the sealant 40), the array substrate 20 is, in each first groove 28a, bonded to the sealant 40 through the transparent conductive film 26b (see FIG. 6) or the substrate body 21 (see FIG. 8). That is, it can be seen that the sealant 40 is, in each first groove 28a, bonded to the component made of the inorganic material, leading to firm bonding in the first grooves 28a. Thus, although adhesion of the sealant 40 in the part where the alignment film 27 is formed so as to extend to the middle of the sealant region SL in the width direction thereof is lower as compared to the case where no alignment film is formed, excellent adhesion between each substrate and the sealant 40 is achieved outside the middle of the sealant region SL in the width direction thereof (i.e., in the region of the sealant region SL including the outer circumferential side 40b of the sealant 40) because of the absence of the alignment film 27. Consequently, the array substrate 20 is favorably bonded to the sealant 40.

In addition, since the first grooves 36a are formed at the counter substrate 30, the alignment film 35 does not reach the region of the sealant region SL including the outer circumferential side 40b of the sealant 40.

For more details on the bonding state between the counter substrate 30 and the sealant 40 outside the middle of the sealant region SL in the width direction thereof (i.e., in the region of the sealant region SL including the outer circumferential side 40b of the sealant 40), the counter substrate 30 is, in each first groove 36a, bonded to the sealant 40 through the common electrode 34 (see FIG. 6). That is, it can be seen that the sealant 40 is, in each first groove 36a, bonded to the component made of the inorganic material, leading to firm bonding in the first grooves 36a. Thus, although adhesion of the sealant 40 in the part where the alignment film 35 is formed so as to extend to the middle of the sealant region SL in the width direction thereof is lower as compared to the case where no alignment film is formed, excellent adhesion between each substrate and the sealant 40 is achieved outside the middle of the sealant region SL in the width direction thereof (i.e., in the region of the sealant region SL including the outer circumferential side 40b of the sealant 40) because of the absence of the alignment film 35. Consequently, the counter substrate 30 is favorably bonded to the sealant 40. Since the array substrate 20 and the counter substrate 30 are each firmly bonded to the sealant 40, the space where the liquid crystal layer 50 is formed is sufficiently sealed.

Further, according to the liquid crystal display device 10 of the present embodiment, since the stopper layer 24a is formed corresponding to the bottom of each first groove 28a at the array substrate 20, the interlayer insulating film 25 made of the organic insulating material is completely removed below the bottom of each first groove 28a. That is, part of the interlayer insulating film 25 formed on the outer circumferential side relative to the sealant region SL is completely isolated from part of the interlayer insulating film 25 on the inner circumferential side relative to the sealant region SL by the first grooves 28a formed in a circular shape. Even if, e.g., moisture enters through part, exposed to external air, of the interlayer insulating film 25 on the outer circumferential side relative to the sealant region SL, the moisture does not permeate part of the interlayer insulating film 25 on the inner circumferential side relative to the sealant region SL. Thus, there is no possibility that adhesion at the interface between the alignment film and the interlayer insulating film 25 is lowered due to moisture permeation.

(Variations)

Variations of the embodiment of the present invention will be described below.

Figure 9:
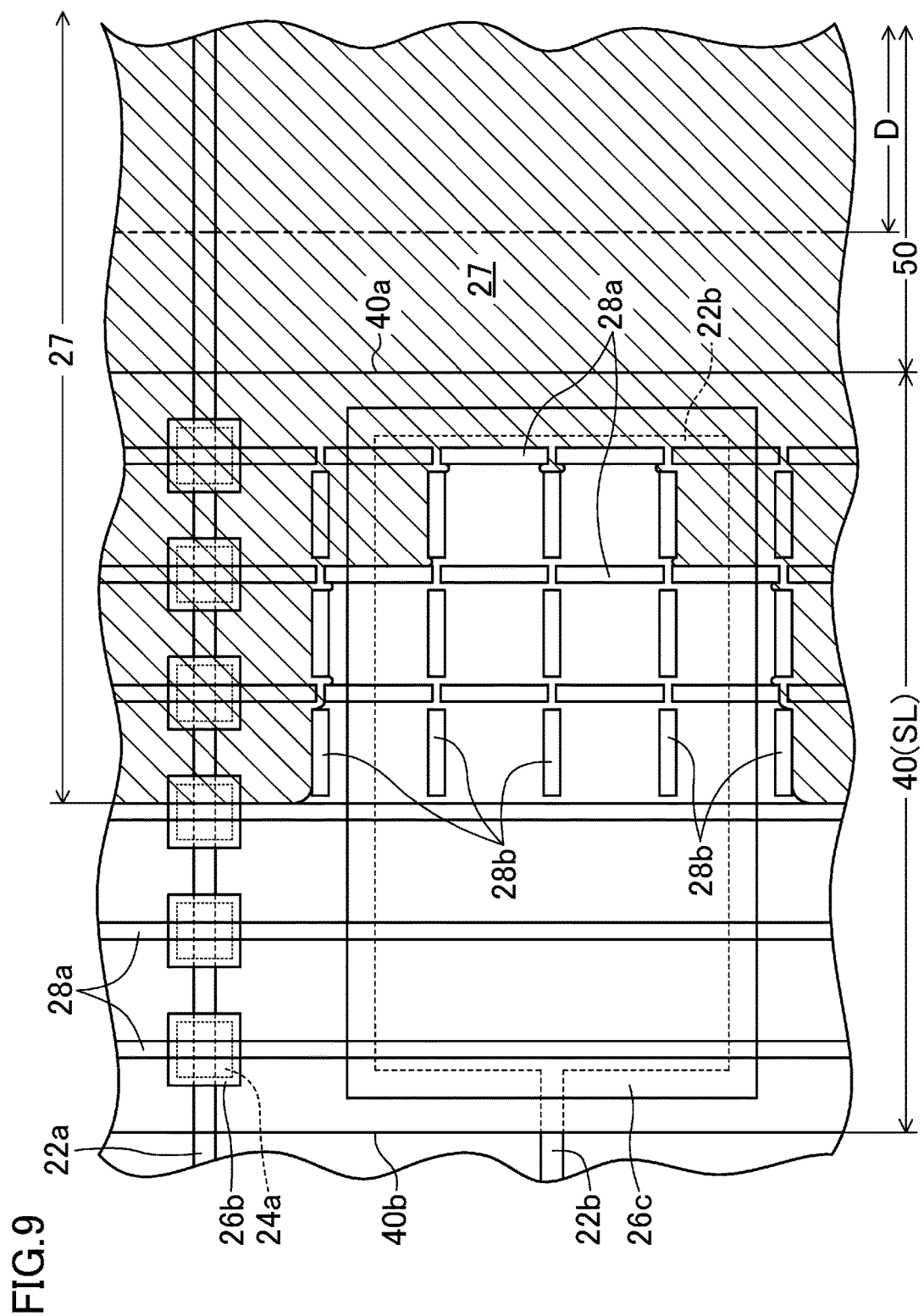
FIG. 9 is a plan view of a liquid crystal display device of a first variation, and corresponds to the region AR2 of FIG. 4.

In the foregoing embodiment, it has been described that the second grooves 28b, 36b are formed across the entirety of the sealant region SL in the width direction thereof at the array substrate 20 and the counter substrate 30, but the present invention is not limited to such a configuration. For example, as in a first variation illustrated in FIG. 9, the second grooves 28b may be formed only on the side close to the display region D relative to the middle of the sealant region SL in the width direction thereof (i.e., in the region of the sealant region SL including the inner circumferential side 40a of the sealant 40) in the region where the common transition electrodes 26c are formed. Although some of the common transition electrodes 26c on the side close to the display region D relative to the middle of the sealant region SL in the width direction thereof are covered by the alignment film 27, the second grooves 28b formed in advance in the region to be covered by the alignment film 27 can reduce covering of the common transition electrodes 26c by the alignment film 27.

In the foregoing embodiment, it has been described that, in the region where the common transition electrodes 26c are formed, the first grooves 28a and the second grooves 28b are formed in a grid pattern and that the first grooves 28a and the second grooves 28b are formed discontinuous at each intersection between the first groove 28a and the second groove 28b. However, the present invention is not limited to such a configuration.

Figure 10:
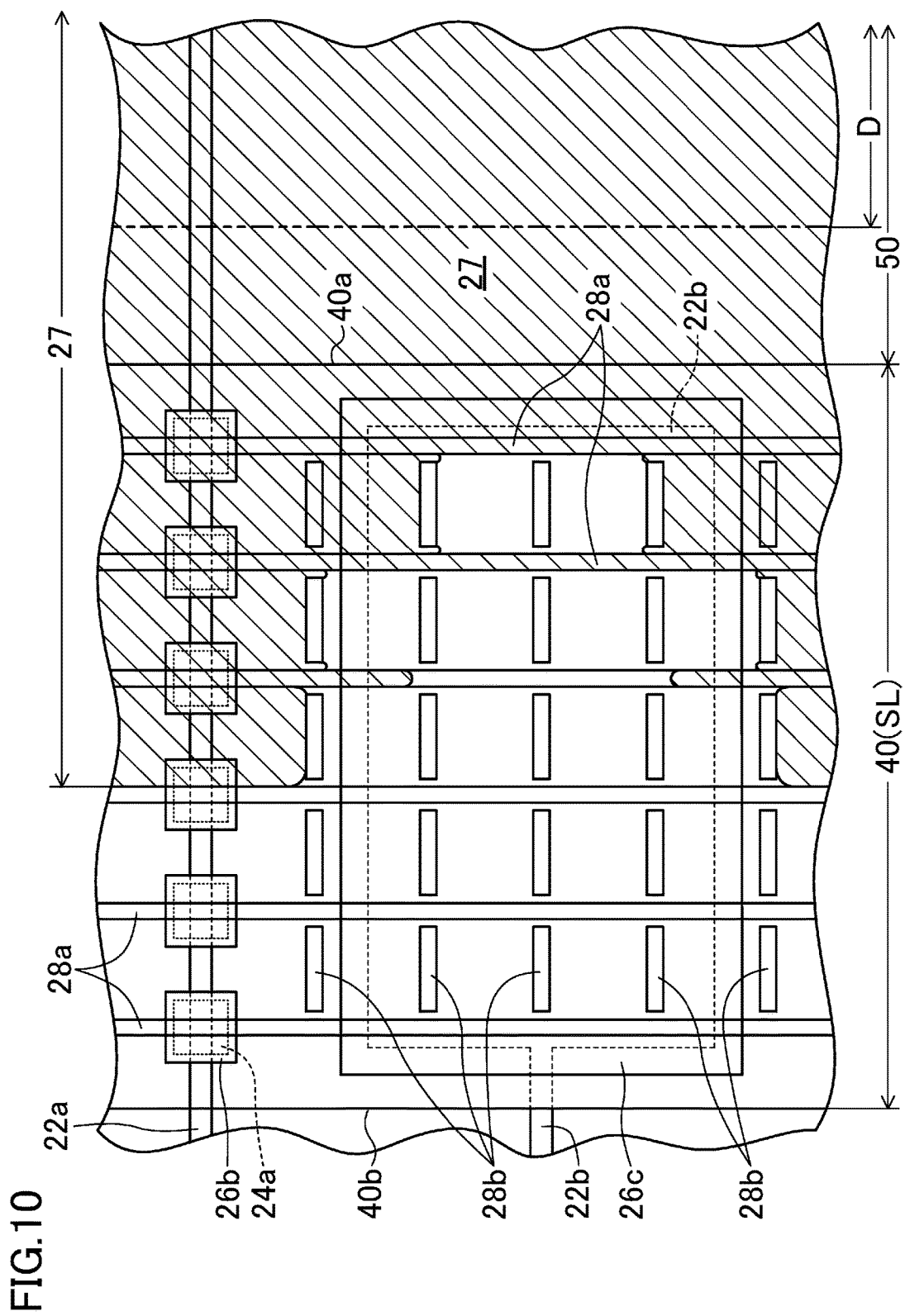
FIG. 10 is a plan view of a liquid crystal display device of a second variation, and corresponds to the region AR2 of FIG. 4.
Figure 11:
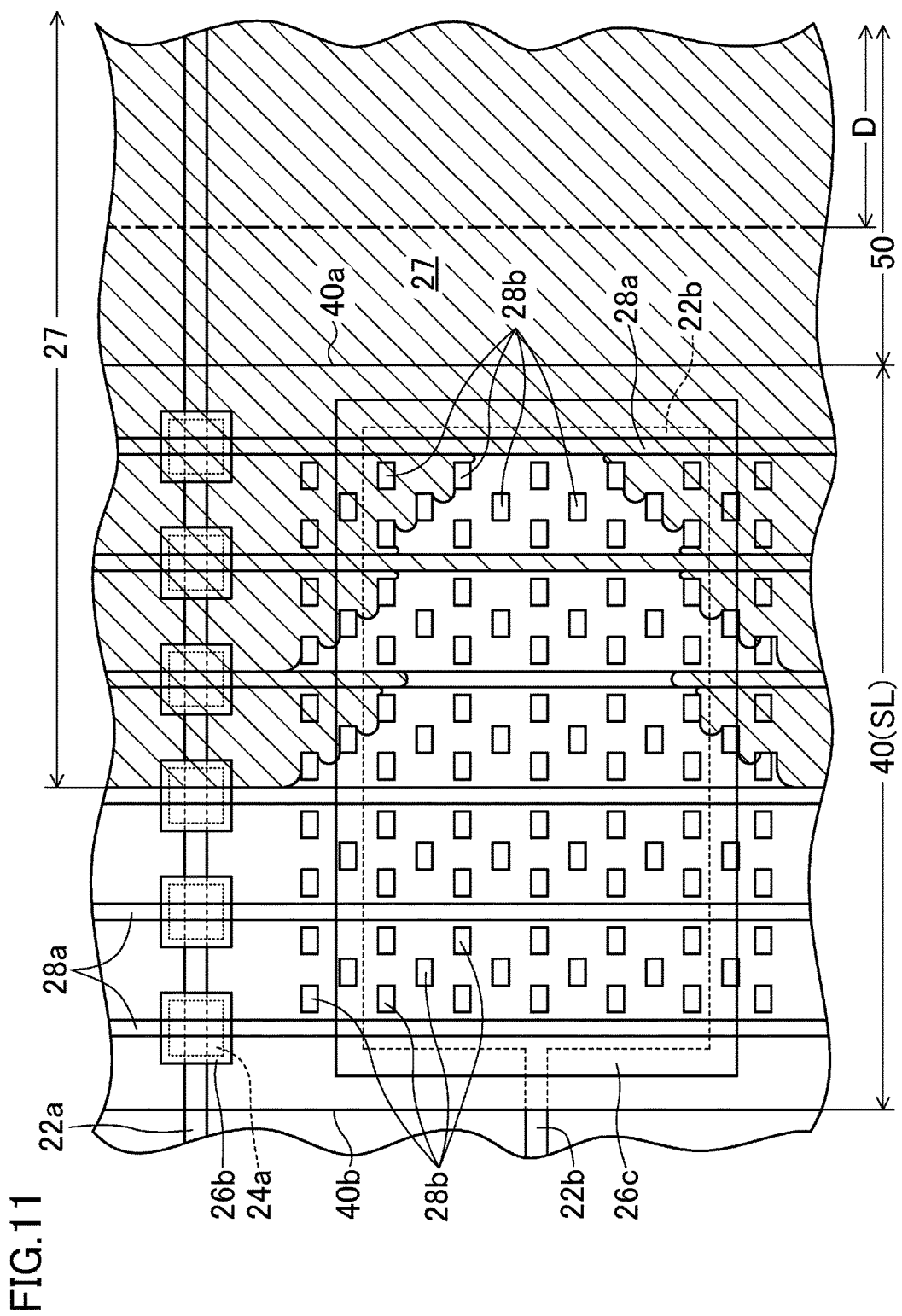
FIG. 11 is a plan view of a liquid crystal display device of a third variation, and corresponds to the region AR2 of FIG. 4.

For example, as in a second variation illustrated in FIG. 10, the first grooves 28a may be formed continuous at each intersection between the first groove 28a and the second groove 28b. In the case of continuously forming the first grooves 28a, the second grooves 28b may be formed discontinuous at part of the array substrate 20 other than the intersections between adjacent ones of the first and second grooves 28a, 28b as in a third variation illustrated in FIG. 11. In this case, the second grooves 28b are preferably formed in a staggered pattern, and are also preferably formed at pitch shorter than that in the case of the foregoing embodiment.

Figure 12:
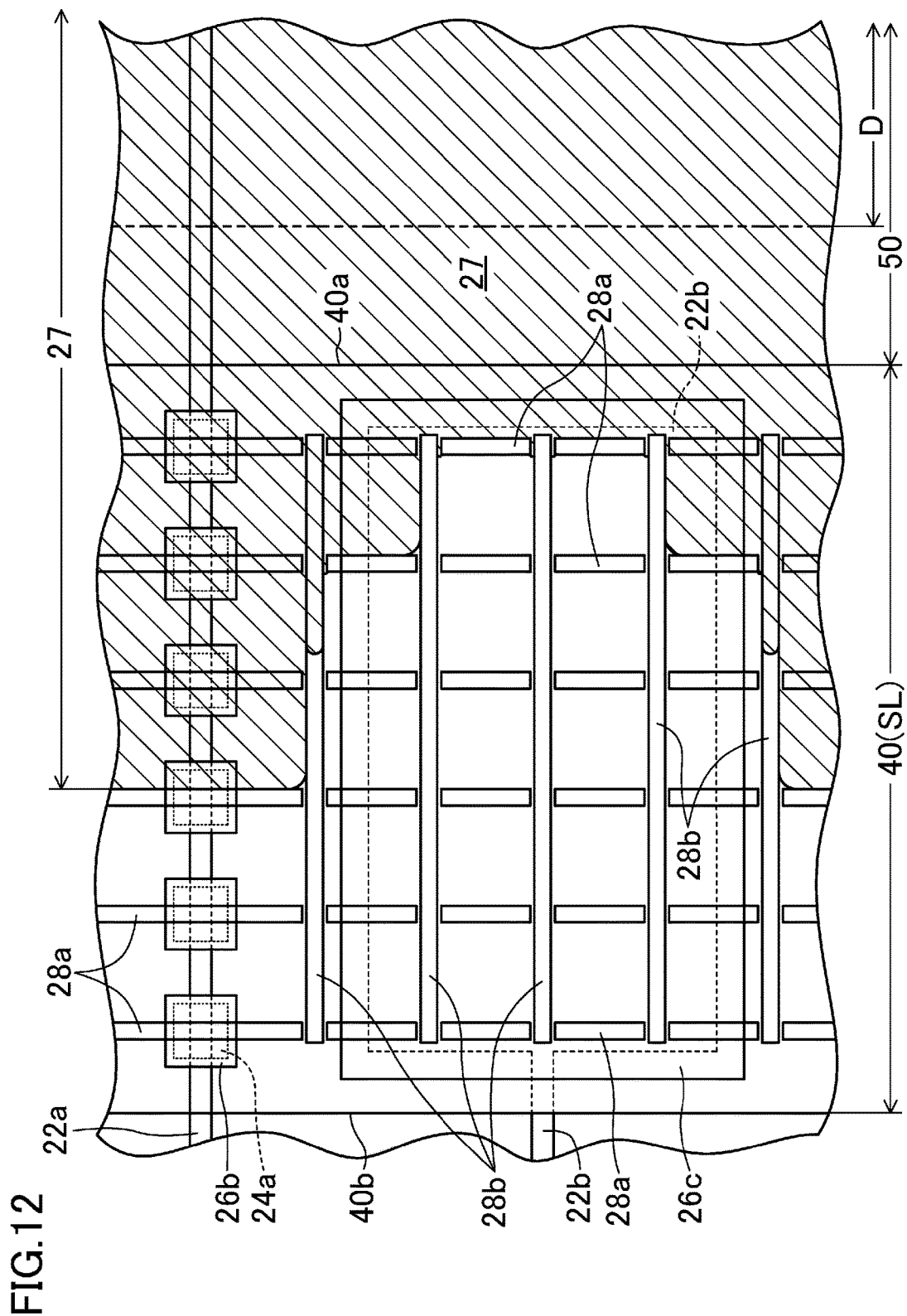
FIG. 12 is a plan view of a liquid crystal display device of a fourth variation, and corresponds to the region AR2 of FIG. 4.
Figure 13:
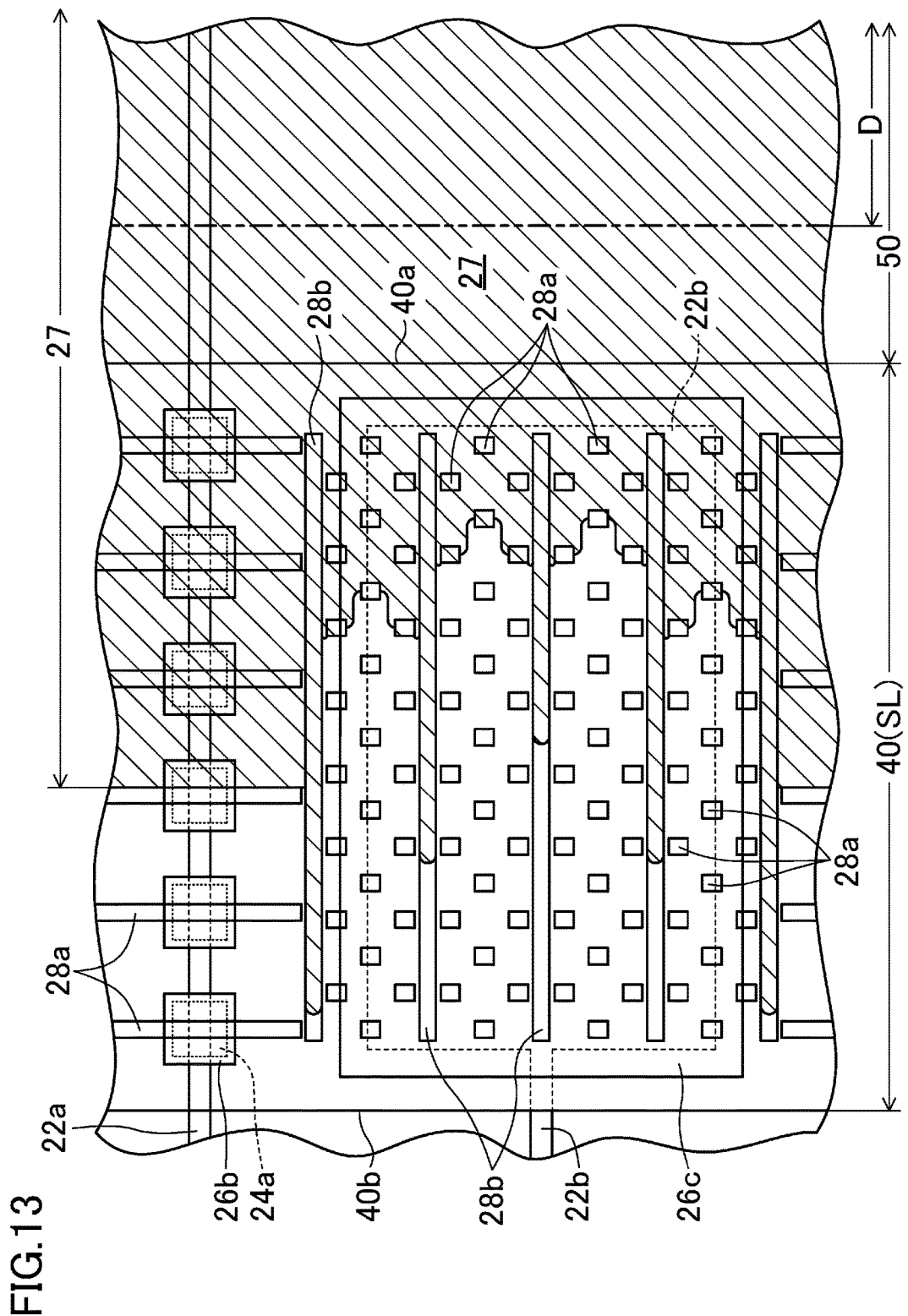
FIG. 13 is a plan view of a liquid crystal display device of a fifth variation, and corresponds to the region AR2 of FIG. 4.

Moreover, for example, as in a fourth variation illustrated in FIG. 12, the second grooves 28b may be formed continuous at each intersection between the first groove 28a and the second groove 28b. In the case of continuously forming the second grooves 28b, the first grooves 28a may be formed discontinuous at part of the array substrate 20 other than the intersections between adjacent ones of the first and second grooves 28a, 28b as in a fifth variation illustrated in FIG. 13. In this case, the first grooves 28a are preferably formed in a staggered pattern. In such a state, the pitch of the first grooves 28a, formed in the staggered pattern, in the width direction of the sealant region SL in the region where the common transition electrodes 26c are formed is preferably shorter than that in the region other than the region where the common transition electrodes 26c are formed.

In the foregoing embodiment, although it has been described that six lines of first grooves 28a, 36a are formed at both of the array substrate 20 and the counter substrate 30, the number of grooves to be formed at both substrates may be different between the array substrate 20 and the counter substrate 30. For example, six lines of first grooves 28a may be formed at the array substrate 20, whereas seven lines of first grooves 36a may be formed at the counter substrate 30.

In the foregoing embodiment, it has been described that the first grooves 28a, 36a are formed in a frame shape along the sealant region SL at the array substrate 20 and the counter substrate 30, but the present invention is not limited to such a configuration. For example, grooves may be formed along only a single side of the sealant region SL (e.g., the side of the sealant region SL along the terminal region T).

In the foregoing embodiment, it has been described that the first grooves 28a are, at the array substrate 20, formed in such a manner that part of the interlayer insulating film 25 is removed. However, in the case where the interlayer insulating film 25 is formed of a multilayer of an inorganic insulating film and an organic insulating film formed thereon, the first grooves 28a may be formed in such a manner that only the organic insulating film of the interlayer insulating film 25 is partially removed.

In addition to the configuration of the foregoing embodiment, the same silicon film as a semiconductor film of the thin film transistor may be formed in an island shape between the gate insulating film 23 and the stopper layer 24a in each first groove 28a of the array substrate 20. Even in the case where raised parts are formed at the surface of the gate insulating film 23 due to the presence of the interconnects 22a, reduction or prevention of occurrence of leakage can be further ensured in such a manner that the silicon layer is stacked below the stopper layer 24a.

In the foregoing embodiment, it has been described that the black matrix 33 is, at the counter substrate 30, provided at the boundary between the display region D and the non-display region F to shield light. However, light may be shielded at the boundary between the display region D and the non-display region F not at the counter substrate 30 but at the array substrate 20. In this case, light can be shielded using, e.g., the second conductive film in the foregoing region.

In the foregoing embodiment, it has been described that the first groove 28a is formed in a circular shape, but part thereof may be discontinuously formed. In addition, the first grooves 28a may be formed only at part of the non-display region F along, e.g., two of four sides forming the rectangular display panel.

In the foregoing embodiment, it has been described that the first grooves 28a and the second grooves 28b are formed at the array substrate 20 and that the first grooves 36a and the second grooves 36b are formed at the counter substrate 30. However, the first grooves 28a and the second grooves 28b are formed only at the array substrate 20, or the first grooves 36a and the second grooves 36b are formed only at the counter substrate 30.

In the foregoing embodiment, it has been described that the alignment films 27, 35 are formed so as to extend to the middle of the sealant region SL in the width direction thereof. However, in the case where sufficient adhesion of the sealant 40 can be ensured, the alignment films 27, 35 may be formed so as to cover the entirety of the sealant region SL in the width direction thereof.

INDUSTRIAL APPLICABILITY

The present invention is useful for liquid crystal display devices. In particular, the present invention is useful for the structure of controlling an alignment film formation region in a non-display region of a display panel.

DESCRIPTION OF REFERENCE CHARACTERS

D Display Region
F Non-Display Region
10 Liquid Crystal Display Device
20 Array Substrate
21 Substrate Body
22a Interconnect (First Interconnect)
23 Gate Insulating Film (First Insulating Film)
24a Stopper Layer (Second Interconnect)
25 Interlayer Insulating Film (Second Insulating Film)
26b Transparent Conductive Film
26c Common Transition Electrode
27 Alignment Film
28a First Groove
28b Second Groove
30 Counter Substrate
32a Color Filter Layer
32b Color Filter Layer
34 Common Electrode
35 Alignment Film
36a First Groove
36b Second Groove
40 Sealant
42 Transfer Material
50 Liquid Crystal Layer

The invention claimed is:

1. A liquid crystal display device comprising:
an array substrate having a display region and a non-display region surrounding the display region;
a counter substrate disposed so as to face the array substrate and formed with a common electrode;
a sealant applied to the non-display region so as to surround the display region and bonding the array substrate and the counter substrate together;
a liquid crystal layer formed between the array substrate and the counter substrate in a region surrounded by the sealant;
a common transition electrode provided in a sealant region of the array substrate where the sealant is applied;
a transfer material contained in the sealant and contacting the common electrode and the common transition electrode to electrically connect the common electrode and the common transition electrode together; and
alignment films formed so as to extend across the display region and part of the non-display region, one of the alignment film being formed between the array substrate and the liquid crystal layer and the other alignment film being formed between the counter substrate and the liquid crystal layer,
wherein at least one of the array substrate or the counter substrate is formed with
a plurality of first grooves, in the sealant region, being apart from each other in a width direction of the sealant region and extending along a length direction of the sealant region, and
a plurality of second grooves, in a region corresponding to a region where the common transition electrode is formed, being apart from each other in the length direction of the sealant region and extending along the width direction of the sealant region.

2. The liquid crystal display device of claim 1, wherein the sealant region includes a region where the sealant contacts part of the alignment film covering at least surfaces of some of the first grooves.

3. The liquid crystal display device of claim 1, wherein the first and second grooves are formed at both of the array substrate and the counter substrate.

4. The liquid crystal display device of claim 1, wherein at the array substrate, an insulating film formed below the common transition electrode is formed of a single-layer film of an organic insulating film or a multilayer film of an inorganic insulating film and an organic insulating film formed on the inorganic insulating film, and
each first groove is formed at a position where at least the organic insulating film is partially removed.

5. The liquid crystal display device of claim 4, wherein the organic insulating film is made of acrylic resin.

6. The liquid crystal display device of claim 1, wherein the transfer material is formed of spherical conductive beads, and
a width of each first groove and a width of each second groove are less than a diameter of the transfer material.

* * * * *